(12) United States Patent
Jo

(10) Patent No.: US 8,730,539 B2
(45) Date of Patent: May 20, 2014

(54) IMAGE READING APPARATUS HAVING AUTO DOCUMENT FEEDER

(75) Inventor: Yong-kon Jo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1878 days.

(21) Appl. No.: 11/643,987

(22) Filed: Dec. 22, 2006

(65) Prior Publication Data

US 2007/0183004 A1  Aug. 9, 2007

(30) Foreign Application Priority Data

Feb. 6, 2006  (KR) .................. 10-2006-0011242

(51) Int. Cl.
*H04N 1/04* (2006.01)

(52) U.S. Cl.
USPC ........................................................ 358/498

(58) Field of Classification Search
USPC ....................... 358/1.13, 1.14, 498
See application file for complete search history.

(56) References Cited

U.S. PATENT DOCUMENTS

| | | | |
|---|---|---|---|
| 4,714,241 A | 12/1987 | Randall | |
| 4,806,979 A | 2/1989 | Tokoro et al. | |
| 5,298,937 A | 3/1994 | Telle | |
| 5,504,568 A | 4/1996 | Saraswat et al. | |
| 5,784,680 A * | 7/1998 | Taruki | 399/374 |
| 6,209,861 B1 * | 4/2001 | Kakuta et al. | 271/3.02 |
| 6,644,652 B1 | 11/2003 | Walsh et al. | |
| 2006/0280534 A1 * | 12/2006 | Cook et al. | 399/374 |

FOREIGN PATENT DOCUMENTS

| | | |
|---|---|---|
| CN | 1217514 A | 5/1999 |
| JP | 62-280133 | 12/1987 |
| JP | 9-166896 | 6/1997 |
| JP | 2000-235285 | 8/2000 |
| JP | 2004-4781 | 1/2004 |

OTHER PUBLICATIONS

Office Action issued in Korean Patent Application No. 2006-11242 on Dec. 18, 2006.
Chinese Office Action dated Feb. 5, 2010 and issued in corresponding Chinese Patent Application 200710006146.7.

* cited by examiner

*Primary Examiner* — King Poon
*Assistant Examiner* — Iriana Cruz
(74) *Attorney, Agent, or Firm* — Staas & Halsey LLP

(57) ABSTRACT

An image reading apparatus having an auto document feeder includes a simplex path for simplex reading, a duplex path which is distinguishable from the simplex path and conveys a plurality of sheets of paper at different positions in a duplex reading mode, a path selecting element, and a flipping element which allows a second side of paper to be read first. Accordingly, in the duplex reading mode, a separation distance between sheets of paper is reduced, a returning path is reduced, the second side of paper is first read, and the paper is collated and then discharged after both sides of paper are read, thereby significantly improving duplex reading efficiency.

21 Claims, 7 Drawing Sheets

IMAGE READING APPARATUS HAVING AUTO DOCUMENT FEEDER

CROSS-REFERENCE TO RELATED PATENT APPLICATION

This application claims the benefit of Korean Patent Application No. 2006-11242, filed on Feb. 6, 2006 in the Korean Intellectual Property Office, the disclosure of which is incorporated herein in its entirety by reference.

BACKGROUND OF THE INVENTION

1. Field of the Invention

Aspects of the present invention relate to an image reading apparatus having an auto document feeder, and more particularly, to an image reading apparatus having an auto document feeder and which reads an image while a piece of paper is being conveyed.

2. Description of the Related Art

In general, image reading apparatuses read an image recorded on paper by irradiating light thereon. Such image reading apparatuses may be scanners, facsimiles, or multifunction printers. An image reading apparatus includes a scanning module for reading an image printed on paper. The scanning module reads the image printed on paper in the form of an optical signal, by irradiating light on the paper. The scanning module converts the optical signal into an electrical signal sent that is sent to a signal processing module included in the image reading apparatus.

To read the image from paper, the scanning module or the paper needs to be moved. In a flat-bed type image reading apparatus, the scanning module is moved. On the other hand, in a sheet-feed type image reading apparatus, the paper is moved. In a hybrid type image reading apparatus, a flat-bed type image reading apparatus includes an auto document feeder (ADF), and thus can function also as a sheet-feed type image reading apparatus. The hybrid type image reading apparatus will now be described.

The hybrid type image reading apparatus includes a glass plate on which the paper is placed, and a scanning module which is located at the rear side of the glass plate. The scanning module includes a light scanning unit which irradiates light onto the paper, and an image sensor which converts an optical signal obtained by reading the image from the paper into an electrical signal. An auto document feeder included in the hybrid type image reading apparatus is located at the upper side of the glass plate, and conveys the paper to the scanning module. The scanning module is located at the rear side of the glass plate in a fixed state, and reads the image from the paper being conveyed.

FIG. 1 is a side cross-sectional view of a conventional auto document feeder (ADF). Referring to FIG. 1, a duplex ADF includes a feeding tray 81, a pick-up roller 82, a returning roller 83, first and second feed rollers 84 and 87, an adhering member 85, a scanning module 86, a discharging roller 88, and a discharging tray 89. Papers S1 and S2 are loaded on the feeding tray 81. The pick-up roller 82 picks up the papers S1 and S2 loaded on the feeding tray 81. The first feed roller 84 is located upstream of the scanning module 86, and conveys the papers S1 and S2, which are conveyed from the pick-up roller 82, to the scanning module 86. The scanning module 86 faces the adhering member 85, and the papers S1 and S2 pass between the scanning module 86 and the adhering member 85 when an image is read from the papers S1 and S2. The second feed roller 87 is located downstream of the scanning module 86, and conveys the papers S1 and S2 to the discharging roller 88, after the papers S1 and S2 have passed the scanning module 86. The discharging roller 88 discharges the papers S1 and S2, conveyed from the second feed roller 87, to the discharging tray 89. The discharged papers S1 and S2 are loaded on the discharging tray 89.

In a duplex reading mode, after one side of the papers S1 and S2 is read, the papers S1 and S2 are not completely discharged out of the discharging tray 89, and one portion of the papers S1 and S2 is still held at the discharging roller 88. To read the other side of the papers S1 and S2, the discharging roller 88 rotates in reverse to convey the papers S1 and S2 towards the returning roller 83. The returning roller 83 returns the papers S1 and S2 to a point upstream of the scanning module 86.

The papers S1 and S2 each have a first side P1 and a second side P2. As shown in FIG. 1, the papers S1 and S2 are loaded on the feeding tray 81, where the first side P1 is the upper side. When the two papers S1 and S2 are loaded on the feeding tray 81, the paper S2 is loaded first with the second side P2 facing the feeding tray 81 and the first side P1 facing the second side P2 of the paper S1 loaded on top of the paper S2. When the papers S1 and S2 are discharged out of the ADF after reading is completed, the papers S1 and S2 are collated and loaded on the discharging tray 89 with the first side P1 of the paper S1 facing the discharging tray 89 and the second side S2 facing the first side P1 of the paper S2 loaded on top of the paper S1. If the papers S1 and S2 are loaded on the discharging tray 89 in a different order, a user has to collate the papers S1 and S2 again, which is inconvenient.

The papers S1 and S2 are conveyed along different paths depending on which mode is selected from a simplex reading mode, wherein the first sides P1 of the papers S1 and S2 are read, and a duplex reading mode, wherein the first and the second sides P1 and P2 of the papers S1 and S2 are read. When the single-sided (i.e., simplex) reading mode is selected, the papers S1 and S2 are conveyed along the feeding tray 81, the pick-up roller 82, the first feed roller 84, the scanning module 86, the second feed roller 87, the discharging roller 88, and the discharging tray 89, in this order. Then, as described above, the papers S1 and S2 are collated and loaded on the discharging tray 89.

When the dual-sided (i.e., duplex) reading mode is selected, the papers S1 and S2 are conveyed along the feeding tray 81, the pick-up roller 82, the first feed roller 84, the scanning module 86, the second feed roller 87, and the discharging roller 88, in this order, and thereafter the first sides P1 of the papers S1 and S2 are read. Next, to read the second side P2 of the papers S1 and S2, the discharging roller 88 rotates in reverse to convey the papers S1 and S2 towards the returning roller 83. In other words, the papers S1 and S2 are conveyed along the discharging roller 88, the returning roller 83, the first feed roller 84, the scanning module 86, the second feed roller 87, and the discharging roller 88, in this order, and thereafter the second side P2 is read.

Given that the first side P1 is the upper side, the papers S1 and S2 are reversely collated. To collate the papers S1 and S2, the papers S1 and S2 are re-conveyed along the discharging roller 88, the returning roller 83, the first feed roller 84, the scanning module 86, the second feed roller 87, and the discharging roller 88, in this order. Here, the scanning module 86 does not operate, and the papers S1 and S2 only are conveyed for collating. In comparison with the single-sided reading, reading efficiency significantly decreases because the papers S1 and S2 are re-conveyed only to collate the papers S1 and S2. The reading efficiency is defined as a ratio of the number of papers S1 and S2 discharged per unit hour in the duplex reading mode to the number of papers S1 and S2 discharged per unit hour in the simplex reading mode.

To prevent the papers S1 and S2 from jamming, the second paper S2 is picked up after the first paper S1 is completely discharged, and then conveying is carried out along the depicted conveying path. The conveying length in the duplex reading mode is about three times of that in the single-sided reading mode. If simplex reading is performed at a speed of 60 papers per minute (PPM)(that is, 60 sheets of paper are discharged for one minute) then, duplex reading is performed at the speed of about 20 PPM (that is, 20 sheets of paper are discharged for one minute) and as a result, the duplex reading efficiency is merely about 30%.

SUMMARY OF THE INVENTION

Aspects of the present invention provide an image reading apparatus having an auto document feeder which can be used for duplex reading, can collate discharged paper sheets, and has improved reading efficiency.

According to an aspect of the present invention, there is provided an image reading apparatus having an auto document feeder which conveys paper and a scanning module which reads an image from the paper conveyed by the auto document feeder, the auto document feeder comprising: a simplex path, which is a conveying path in a simplex reading mode; a duplex path, which is distinguishable from the simplex path, along which a plurality of sheets of papers is conveyed at different positions in a duplex reading mode; and a path selecting element which opens the simplex path in the simplex reading mode, and opens the duplex path in the duplex reading mode.

According to an aspect of the present invention, the path selecting element comprises a paper guide which is selectively pivoted to a first position for opening the simplex path and a second position for opening the duplex path.

According to an aspect of the present invention, the simplex path comprises a pick-up unit which picks up the paper and a scanning path on which the scanning module is located, and the duplex path comprises the scanning path, a bypass path which is branched off from the scanning path in upstream of the scanning module, and in which a storage temporarily storing the picked up paper is located, a connecting path which returns the paper in the storage towards upstream of the scanning module, and a returning path which re-conveys the paper, of which one side is read while the paper passes the scanning module, towards a point upstream of the scanning module.

According to an aspect of the present invention, the bypass path and the connecting path convey the paper independently from the scanning path and the returning path.

According to an aspect of the present invention, to reduce a duplex reading time, a time point where a rear end of a first paper reaches the scanning module after passing along the returning path is synchronized with a time point where a front end of a second paper stored in the storage reaches the scanning module following the rear end of the first paper.

According to an aspect of the present invention, the first side of the paper is read in the simplex reading mode, and in the duplex reading mode, the second side of the paper is first read while the paper passes the scanning module from the connecting path, and the first side is read while the paper re-passes the scanning module from the returning path.

According to an aspect of the present invention, the auto document feeder further comprises a stack roller which rotates in a first direction to store the picked up paper to the storage, and rotates in a second direction to convey the paper stored in the storage towards the connecting path.

According to an aspect of the present invention, the auto document feeder further comprises: a discharging tray whereon the paper discharged out of the auto document feeder is stored; and a discharging roller which rotates in a first direction to discharge the paper to the discharging tray after the paper passes the scanning module, and rotates in a second direction to convey the paper discharged out of the discharging tray towards the returning path.

According to an aspect of the present invention, a conveying path starting from the discharging roller to the scanning module via the returning path is shorter than a conveying path starting from the pick-up unit to the scanning module.

According to an aspect of the present invention, the pick-up unit comprises: a pick-up belt to pick up the paper; first and second pick-up rollers which allow the pick-up belt to travel, and support both ends of the pick-up belts; and an arranging unit which arranges the front end of the picked up paper.

According to an aspect of the present invention, the auto document feeder further comprises first and second feed rollers which are respectively located in upstream and downstream of the scanning module, and convey the paper.

According to an aspect of the present invention, the auto document feeder further comprises a returning roller which conveys the paper from the returning path towards the scanning path.

According to another aspect of the present invention, there is provided an image reading apparatus having an auto document feeder which conveys paper and a scanning module which reads image on the paper conveyed by the auto document feeder, the auto document feeder comprising: a scanning path on which a pick-up unit picking up the paper and the scanning module are located; a bypass path which is branched off from the scanning path in upstream of the scanning module, and in which a storage temporarily storing the picked up paper is located, a path selecting element which opens the bypass path in the duplex reading mode; and first and second flipping elements which are respectively located at the bypass path and downstream of the scanning module, and flip the paper in the duplex reading mode, wherein, the first side of the paper is read in the simplex reading mode, and in the duplex reading mode, the paper is flipped by the first flipping element to read first the second side, and then the paper is re-flipped by the second flipping element to read the first side.

According to an aspect of the present invention, the path selecting element comprises a paper guide which pivots to open and close the bypass path.

According to an aspect of the present invention, the first flipping element comprises: a stack roller which rotates in a first direction to store the picked up paper in the storage, and rotates in a second direction to convey the paper stored in the storage towards the connecting path; and a connecting path along which the paper is returned from the storage upstream of the scanning module, wherein the rear end of the paper reaching the stack roller becomes the front end of the paper moving towards the connecting path.

According to an aspect of the present invention, the second flipping element comprises: a discharging tray whereon the paper discharged out of the auto document feeder is loaded; a returning path which re-conveys the paper, of which one side is read while the paper passes the scanning module, towards upstream of the scanning module; and a discharging roller which rotates in a first direction to discharge the paper to the discharging tray after the paper passes the scanning module, and rotates in a second direction to convey the paper discharged out of the discharging tray towards the returning path, wherein the rear end of the paper reaching the stack roller becomes the front end of the paper moving towards the returning path.

According to an aspect of the present invention, the bypass path and the connecting path convey the paper independently from the scanning path and the returning path.

According to an aspect of the present invention, to reduce a duplex reading time, a time point where a rear end of a first paper reaches the scanning module after passing along the returning path is synchronized with a time point where a front end of a second paper stored in the storage reaches the scanning module following the rear end of the first paper.

According to an aspect of the present invention, a conveying path starting from the discharging roller to the scanning module via the returning path is shorter than a conveying path starting from the pick-up unit to the scanning module.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages of the present invention will become more apparent and more readily appreciated by describing in detail exemplary embodiments thereof with reference to the accompanying drawings in which.

DETAILED DESCRIPTION OF THE EMBODIMENTS

Figure 2:
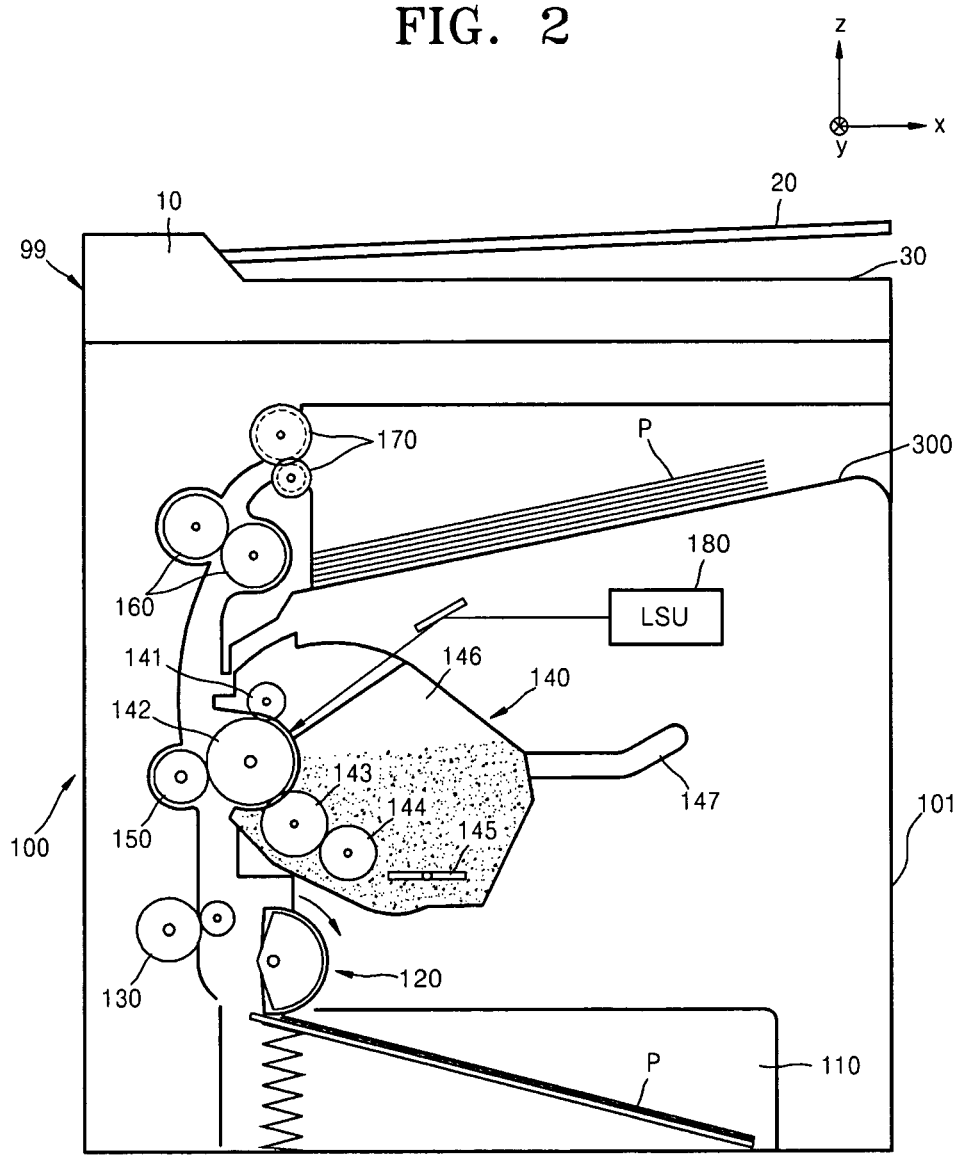
FIG. 2 is a side cross-sectional view illustrating a main part of an image reading apparatus according to an embodiment of the present invention.
Figure 3:
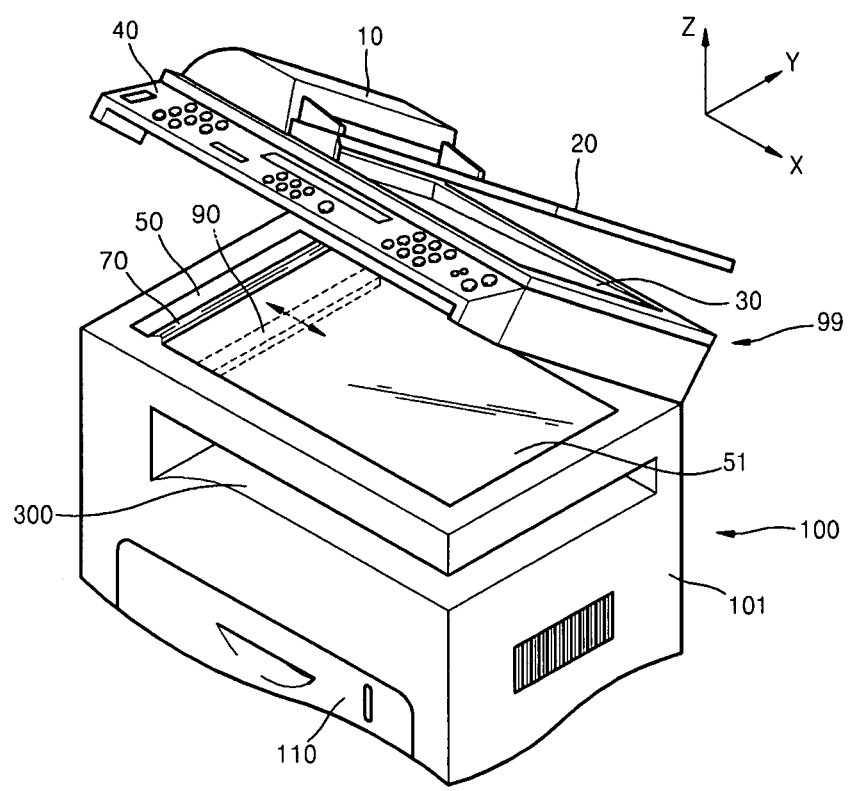
FIG. 3 is a perspective view of the image reading apparatus of FIG. 2.

Hereinafter, aspects the present invention will be described in detail by explaining exemplary embodiments of the invention with reference to the attached drawings, wherein like reference numerals refer to the like elements throughout. The embodiments of the invention are not limited to those shown in the drawings, and various changes in form and details may be made therein without departing from the spirit and scope of the present invention FIG. 2 is a side cross-sectional view of an image reading apparatus according to an embodiment of the present invention. FIG. 3 is a perspective view of the image reading apparatus of FIG. 2. Referring to FIGS. 2 and 3, the image reading apparatus has both functions of scanning and printing. The image reading apparatus includes a printing unit 100 and a scanning unit 99. The printing unit 100 prints an image in an electrophotographic manner. The shown scanning unit 99 includes an auto document feeder 10, and is of a hybrid type that combines a flat-bed type and a sheet-feed type. While shown as a multi-function printer by way of example, it is understood that the present invention is not limited to a multi-function printer, and can include facsimile, copying functions instead of or in addition to the printing function. Additionally, it is understood that the scanning unit 99 need not also include a flat-bed type scanner.

The printing unit 100 includes a light scanning unit 180, a developing cartridge 140, a fixing unit 160, and a cassette feeder 110. The x-axis direction is a sub-scanning direction in which a recording medium P and a paper S are discharged. The y-axis direction is a main-scanning direction that is perpendicular to the sub-scanning direction. Although not shown, the printing unit 100 may print the image in an ink-jet manner or a dye diffusion thermal transfer manner. Additionally, it is understood that other printing units can be used which impart images using other techniques.

The light scanning unit 180 irradiates light corresponding to image information onto a photoconductor 142 to form an electrostatic latent image on the surface of the photoconductor 142. The developing cartridge 140 is located in a detachable manner in a main frame 101 of the image reading apparatus. The shown developing cartridge 140 includes a charging roller 141, the photoconductor 142, a developing roller 143, a supply roller 144, a stirrer 145, and a toner storage 146. The toner storage 146 stores toner. The developing cartridge 140 is replaced when the toner stored in the toner storage 146 is exhausted. The developing cartridge 140 is placed in the main frame 101 of the image reading apparatus when a handle 147 is pushed in a negative x-axis direction, and is separated from the main frame 101 of the image reading apparatus when the handle 147 is pulled in a positive x-axis direction. However, it is understood that the developing cartridge 140 can be otherwise constructed and need not be removable in all aspects of the invention.

The photoconductor 142 rotates in a predetermined direction, with a portion of the surface of the photoconductor 142 being exposed. A photoconductive material is coated on the surface of the cylindrical drum by deposition or an equivalent method. The photoconductor 142 is charged to a predetermined electric potential by the charging roller 141. An electrostatic latent image corresponding to an image to be printed is formed on the surface of the photoconductor 142 using the light irradiated from the light scanning unit 180.

The developing roller 143 has powder type toner on its surface, and attaches the toner onto the electrostatic latent image formed on the photoconductor 142 to be developed into a toner image. A developing bias voltage is applied to the developing roller 143 to supply the toner to the photoconductor 142. The surfaces of the developing roller 143 and the photoconductor 142 come in contact with each other to form a developing nip, or the surfaces thereof are separated from each other to form a developing gap. The developing nip or the developing gap has to be uniformly formed to have a specific size along the axis of the developing roller 143 and the photoconductor 142. Developing is carried out while the toner moves through the developing gap or the developing nip.

The supply roller 144 supplies toner so that the toner is attached onto the developing roller 143. The stirrer 145 stirs the toner to prevent the toner stored in the toner storages 146 from hardening, and conveys the toner towards the supply roller 144. A transfer roller 150 faces the surface of the photoconductor 142. A transfer bias voltage having an opposite polarity with respect to the toner image is applied so that the toner image developed on the photoconductor 142 is transferred onto the recording medium P. The toner image is moved to the recording medium P by an electrostatic force or a mechanical contact pressure between the photoconductor 142 and the transfer roller 150.

The fixing unit 160 includes a heat roller (not labelled) and a pressure roller (not labelled) facing the heat roller. The fixing unit 160 fixes the toner image onto the recording medium P by applying heat and pressure on the toner image transferred onto the recording medium P.

A discharging roller 170 discharges the recording medium P out of the printing unit 100 after the fixing is completed. The recording medium P discharged out of the printing unit 100 is loaded on a discharging tray 300. However, it is understood that the tray 300 and/or cartridge 110 need not be used in all aspects of the invention.

The recording medium P is conveyed as follows. The printing unit 100 includes the cassette feeder 110 storing the recording medium P. The pick-up roller 120 picks up the recording medium P stored in the cassette feeder 110 sheet-by-sheet. The feed roller 130 conveys the picked up recording medium P towards the developing cartridge 140. The recording medium P passes between the photoconductor 142 and the transfer roller 150, and the toner image is transferred onto the recording medium P. Thereafter, the recording medium P is fixed by heat and pressure applied from the fixing unit 160. After fixing is completed, the recording medium P is discharged to the discharging tray 300 by the discharging roller 170.

Referring to FIG. 3, the scanning unit 99 includes a scanning module 90 which reads the image printed on paper by irradiating light thereto, first and second glass plate plates 50 and 51 on which the paper is placed, and an auto document feeder (ADF) 10 which feeds the paper automatically. The x-axis direction is a sub-scanning direction in which the scanning module 90 reads the image and moves. A y-axis direction is a main-scanning direction in which the scanning module 90 reads the image on paper at one time. The plates 50, 51 are shown as being in plane defined by the x and y-axes.

The first glass plate 50 comes in contact with the paper conveyed by the ADF 10 and the second glass plate 51 comes in contact with the unmoving paper. The first glass plate 50 and the second glass plate 51 are separated from each other A paper guiding member 70 is disposed between the first glass plate 50 and the second glass plate 51. The paper guiding member 70 has a tilted surface. The tilt of the paper guiding member 70 guides the front end of the paper passing the first glass plate 50 to the discharging tray 30. A display panel 40 displays operation states of the printing unit 100 and the scanning unit 99, and includes various operation keys. While not required in all aspects, the discharging tray 30 can be the discharging tray 300 used by the printing unit 100.

The paper loaded on a feeding tray 20 is conveyed to the first glass plate 50 by the ADF 10. The scanning module 90 is located at the rear side of the first glass plate 50, and reads the image recorded on the paper. Then, the paper is discharged to the discharging tray 30.

When used as a flat-bed scanner, the paper is supplied sheet-by-sheet without using the ADF 10, and is placed on the upper side of the second glass plate 51. The scanning module 90 is conveyed in the sub-scanning direction along the x-axis at the rear side of the second glass plate 51, and reads the image on the unmoving paper on the plate 51. The scanning module 90 reads the image on the paper supplied to the ADF 10 when the scanning module 90 is positioned at the rear side of the first glass plate 50, and reads the image on the unmoving paper when the scanning module 90 is positioned at the rear side of the second glass plate 51 by moving along the sub-scanning direction relative to the plate 51. The scanning unit 99 is not limited to the above description, and may have various structures.

Figure 4:
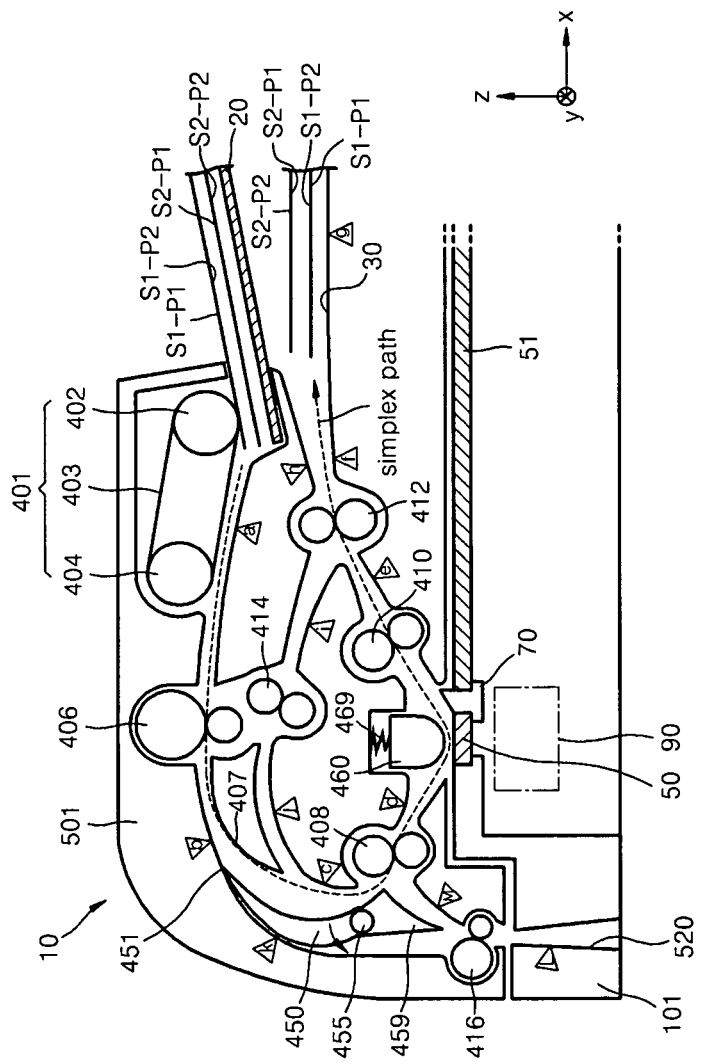
FIG. 4 is a side cross-sectional view of the image forming apparatus of FIG. 3, illustrating a simplex path of an auto document feeder according to an embodiment of the present invention.
Figure 5:
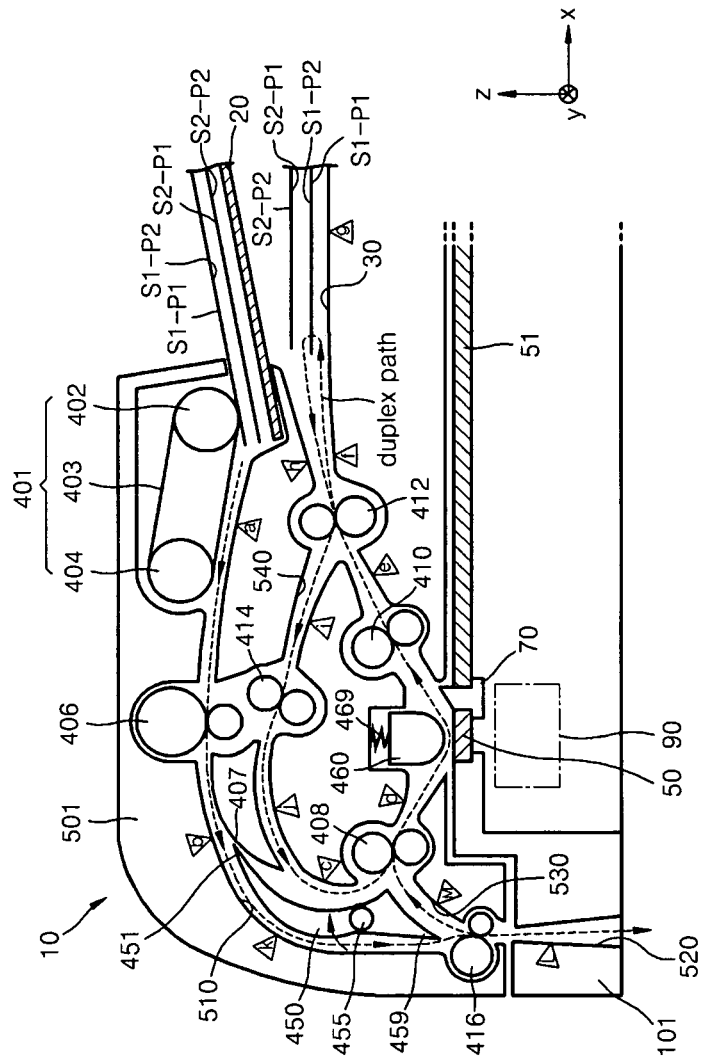
FIG. 5 is a side cross-sectional view of the image forming apparatus of FIG. 3, illustrating a duplex path of an auto document feeder according to an embodiment of the present invention.

FIG. 4 is a side cross-sectional view of the image forming apparatus of FIG. 3, illustrating a simplex path of the ADF 10 according to an embodiment of the present invention. FIG. 5 is a side cross-sectional view of the image forming apparatus of FIG. 3, illustrating a duplex path of the ADF 10 according to an embodiment of the present invention. Referring to FIGS. 4 and 5, the main frame 101 of the image reading apparatus, the ADF 10, the scanning module 90, and the first and second glass plates 50 and 51 are shown. The ADF 10 has a simplex path and a duplex path, which are distinguishable from each other.

As shown in FIG. 4 papers S1 and S2 are conveyed along the simplex path in the simplex reading mode. The simplex path includes a scanning path. A pick-up unit 401 and the scanning module 90 are provided on the scanning path. The pick-up unit 401 picks up the papers S1 and S2 loaded on the feeding tray 20 sheet-by-sheet, and conveys the papers S1 and S2 towards the scanning module 90. The shown pick-up unit 401 includes a pick-up belt 403, first and second pick-up rollers 402 and 404, and an arranging unit 406. The first and second pick-up rollers 402 and 404 support both ends of the pick-up belt 403, and provide a rotation force to the pick-up belt 403. The front ends of the papers S1 and S2 are aligned by the arranging unit 406, after the papers S1 and S2 are picked up sheet-by-sheet while the papers S1 and S2 come in contact with the surface of the pick-up belt 403 travelling along an infinite path. However, it is understood that the pick-up unit 401 can be otherwise constructed, such as the pick-up roller 82 in FIG. 1.

The scanning module 90 faces an adhering member 460, and is located at the rear side of the first glass plate 50. In a monochrome image reading apparatus, the scanning module 90 reads the image on the papers S1 and S2 according to an intensity difference of lights reflected from the papers S1 and S2. The greater the intensity of light reflected from the papers S1 and S2, the whiter the image that is read from the scanning module 90. When the widths of the papers S1 and S2 are shorter than the length of the scanning module 90 in the main-scanning direction along the y-axis, the edge portions (the regions out of the width of the papers S1 and S2 along the main-scanning direction) of the papers S1 and S2 are read as black. This is because the light irradiated onto the edge portions of the papers S1 and S2 are not reflected towards the scanning unit 90 but to a vicinity thereof. To prevent this, the adhering member 460 is used. The adhering member 460 is elastically biased by an additionally provided elastic member 469, is able to reflect light easily due to its white surface, and presses the papers S1 and S2 to be adhered to the first glass plate 50.

While not required in all aspects, as shown, first feed roller 408 is provided upstream of the scanning module 90 to convey the papers S1 and S2 towards the scanning module 90, and second feed roller 410 is provided downstream of the scanning module 90 to convey the papers S1 and S2 towards a discharging roller 412 after the papers S1 and S2 pass the scanning module 90. The papers S1 and S2 are stably conveyed by the first and second feed rollers 408 and 410. The scanning path is defined as a conveying path of the papers S1 and S2 along the pick-up unit 401, the arranging unit 406, the paper guide 450, the first feed roller 408, the adhering member 460, the second feed roller 410, and the discharging roller 412.

A path selecting element (not shown) opens the simplex path in the simplex reading mode, and opens the duplex path in the duplex reading mode. The path selecting element includes the paper guide 450. The paper guide 450 pivots about a hinge 450, and is selectively located at a first or second position. The paper guide 450 pivots towards the first position (see FIG. 4) for opening the simplex path in the simplex reading mode, and pivots towards the second position (see FIG. 5) for opening the duplex path in the duplex reading mode. The paper guide 450 opens a bypass path 510 in the duplex reading mode. While not required in all aspects, the path selecting element can be a manual lever and/or an element actuated when duplex scanning is selected.

The duplex path of FIG. 5 is distinguishable from the simplex path of FIG. 4, and includes conveying paths of the papers S1 and S2 in the duplex reading mode. The duplex path includes the scanning path, the bypass path 510, a connecting path 530, and a returning path 540. The scanning path is described above.

The bypass path 510 is branched off from the scanning path at a branch point 407 located upstream of the scanning module 90. The bypass path 510 includes a storage area 520, which temporarily stores the papers S1 and S2 picked up by the pick-up unit 401, and a stack roller 416. The stack roller 416 rotates in a first direction to store the papers S1 and S2 picked up by the pick-up unit 401 in the storage area 520. The stack roller 416 rotates in a second direction to convey the papers S1 and S2 stored in the storage area 520 towards the connecting path 530. The bypass path 510 is defined as a conveying path along a front end 451 of the paper guide 450, a side of the paper guide 450, the stack roller 416, and the storage area 520.

The connecting path 530 links the scanning path and the bypass path 510, and returns the papers S1 and S2 stored in the storage area 520 to a point in the scanning path upstream of the scanning module 90. The connecting path 530 is defined as a conveying path of the papers S1 and S2 along an exit side of the stack roller 416, a rear side 459 of the paper guider 450, and an entry side of the first feed roller 408.

The returning path 540 returns the papers S1 and S2 to a point of the scanning path upstream of the scanning module 90 again, after the first sides P1 of the papers S1 and S2 are read while passing the scanning module 90, to prepare for reading the second sides P2 thereof. A returning roller 414 is provided on the returning path 540. The returning roller 414 conveys the papers S1 and S2, which are conveyed from the discharging roller 412, towards the upstream of the scanning module 90. The returning path 540 is defined as a conveying path of the papers S1 and S2 along the reversely rotating discharging roller 412, the returning roller 414, and a connecting portion between the returning path 540 and the scanning path.

Figure 1:
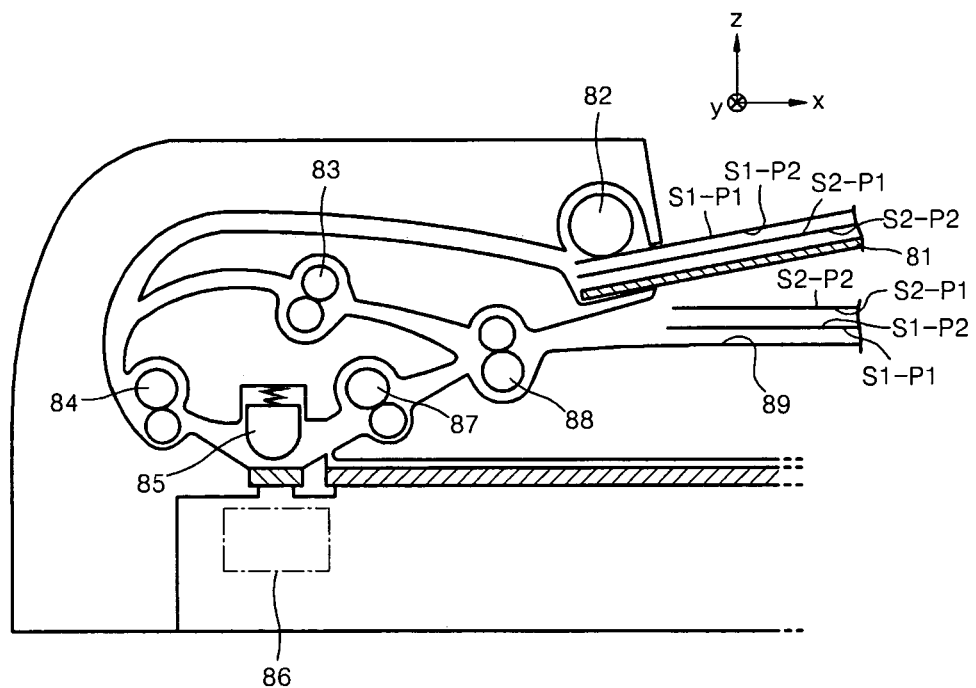
FIG. 1 is a side cross-sectional view of a conventional auto document feeder.

Unlike the duplex path of FIG. 1, the duplex path of shown embodiment shown in FIG. 5 can convey a plurality of sheets of papers S1 and S2 at different positions, thereby significantly improving duplex reading efficiency. By way of example, in the duplex reading mode, the second side P2 of the first paper S1 is read while the first paper S1 passes along the feeding tray 20, the pick-up unit 401, the arranging unit 406, the front end 451 of the paper guide 450, the side of the paper guide 450, the rotating stack roller 416, the storage area 520, the reversely rotating stack roller 416, the connecting path 530, the first feed roller 408, the scanning module 90, the second feed roller 410, and the rotating discharging roller 412. Here, a front end LE1 (see FIG. 6) of the first paper S1 is located at the discharging tray 30, and a rear end TE1 (see FIG. 6) of the first paper S1 is held at the discharging roller 412. Thereafter, while the discharging roller 412 rotates reversely, the rear end TE1 of the first paper S1 held at the discharging roller 412 becomes the front end LE1 of the first paper S1 entering into the returning path 540. The first paper S1 re-enters the scanning path by the reversely rotating discharging roller 412 and the returning roller 414. Then, the first paper S1 passes the first feed roller 408, the scanning module 90, the second feed roller 410, and the rotating discharging roller 412, thereby completing reading of the first side P1. After the first side P1 and the second side P2 are read, the first paper S1 is discharged out of the ADF 10, and is loaded on the discharging tray 30.

Figure 6:
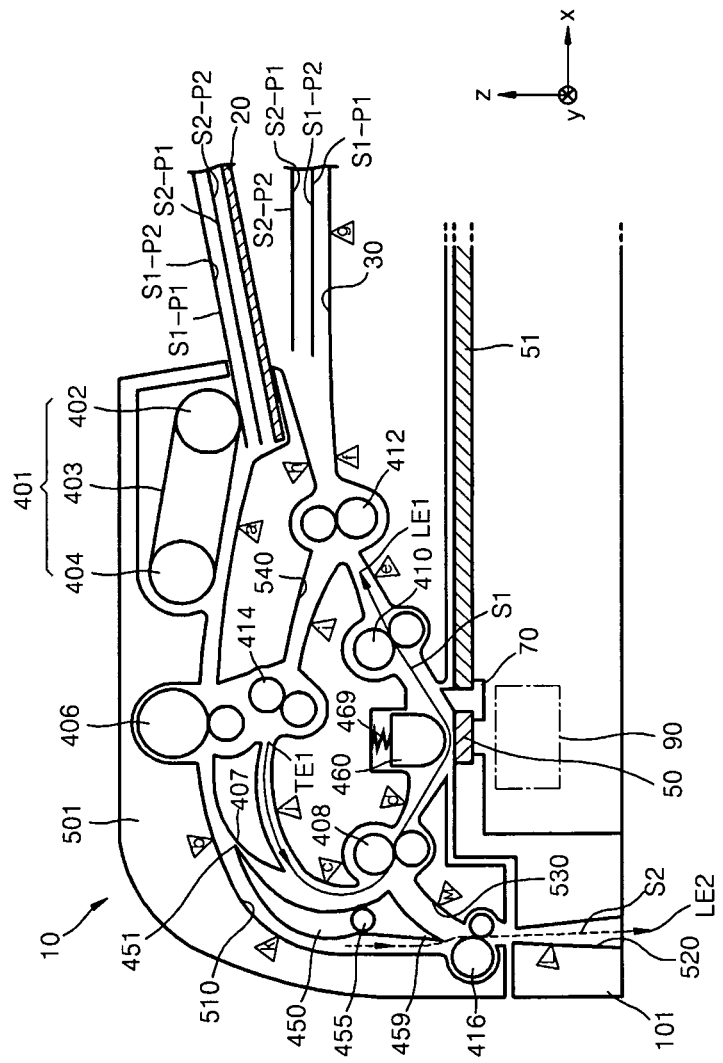
FIG. 6 is a side cross-sectional view the image forming apparatus of FIG. 3, illustrating a first paper and a second paper which are conveyed independently from each other along a duplex path according to an embodiment of the present invention.

FIG. 6 is a side cross-sectional view of the image forming apparatus of FIG. 3, illustrating the first paper S1 and the second paper S2 which are conveyed independently from each other along the duplex path according to an embodiment of the present invention. Referring to FIG. 6, the papers S1 and S2 are conveyed along the bypass path 510 and the connecting path 530 in an independent manner with respect to the scanning path and the returning path 540. While the first paper S1 passes along the scanning path and the returning path 540 to read the first side P1 and the second side P2, the second paper S2 enters into the bypass path 510 by the pick-up unit 401 and the rotating stack roller 416, and is temporarily stored in the storage area 520.

As described above, when the first and second papers S1 and S2 are conveyed at different positions at once, the duplex reading efficiency is significantly improved. In this case, however, the paper jam should be prevented when the first and second papers S1 and S2 are overlapped. Thus, the second paper S2 is temporarily stored in the storage area 520, and is conveyed towards the scanning module 90 at a later time when the paper S2 is not overlapped with the first paper S1. At this time, the stack roller 416 rotates reversely, and the second paper S2 temporarily stored in the storage 520 is conveyed to the connecting path 530.

Figure 7:
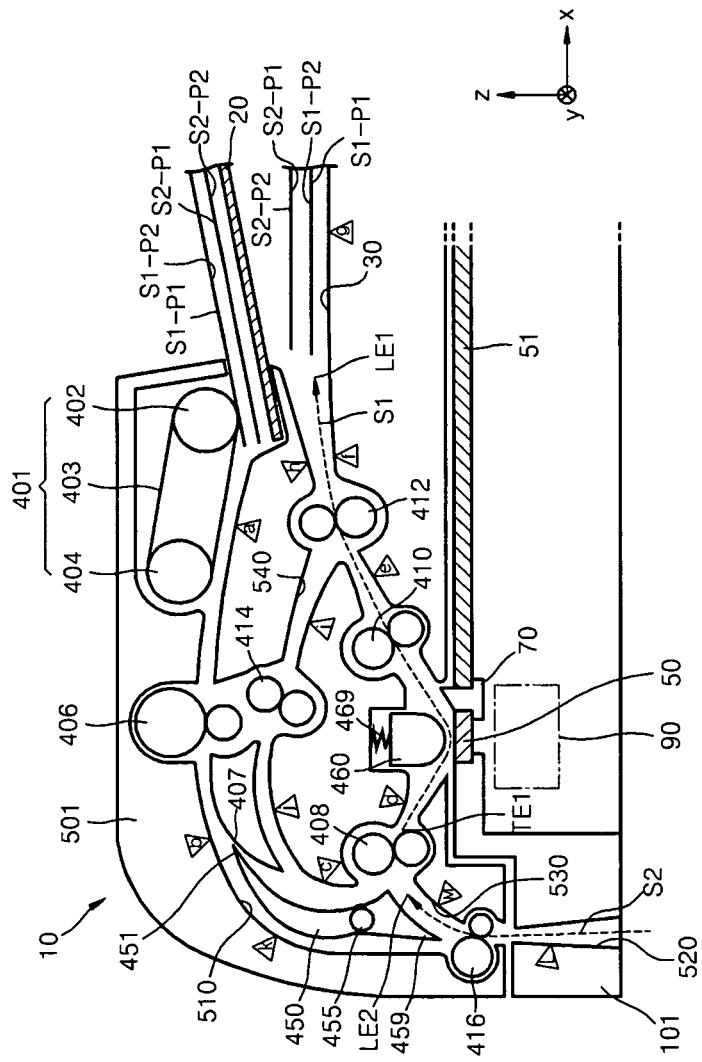
FIG. 7 is a side cross-sectional view the image forming apparatus of FIG. 3, illustrating the positions of a rear end of a first paper and a front end of a second paper, which are synchronized with each other along a duplex path according to an embodiment of the present invention.

FIG. 7 is a side cross-sectional view of the image forming apparatus of FIG. 3, illustrating the positions of a rear end TE1 of the first paper S1 and a front end LE2 of the second paper S2, which are synchronized with each other along the duplex path according to an embodiment of the present invention. A time point where the rear end TE1 of the first paper S1 reaches the scanning module 90 after passing along the returning path 540 may be synchronized with a time point where the front end LE2 of the second paper S2 stored in the storage area 520 reaches the scanning module 90 following the rear end TE1 of the first paper S1. To minimize a separation distance between the first and second papers S1 and S2, a first time point where the rear end TE1 of the first paper S1 passes the first feed roller 408 after passing the returning path 540 may practically coincide with a second time point where the front end LE2 of the second paper S2 reaches the first feed roller 408 after passing the connecting path 530. Preferably and while not required in all aspects, the first and second time points are synchronized with each other with a time delay that is enough to prevent the first and second papers S1 and S2 from jamming. Accordingly, the separation distance between the first and second papers S1 and S2 are minimized, while preventing the first and second papers S1 and S2 from being jammed, thereby significantly improving the duplex reading efficiency.

Referring back to FIG. 1, even after the duplex reading is completed, the conventional ADF 10 re-conveys the papers S1 and S2 along the discharging roller 88, the returning roller 83, the first feed roller 84, the scanning module 86, the second feed roller 87, and the discharging roller 88, in this order, only to collate the papers S1 and S2. At this time, the scanning module 86 does not operate. Such conveying path sharply decreases the duplex reading efficiency.

Referring to FIGS. 5 to 7, aspects the present invention solve the above-mentioned problems by providing first and second flipping elements. In the simplex reading mode, the first sides P1 of the papers S1 and S2 are read, and the second sides P2 thereof are not read. In the simplex reading mode, the papers S1 and S2 do not pass the bypass path 510 and the returning path 540. The stack roller 416 provided in the bypass path 510 does not operate. While rotating in a specific direction, the discharging roller 412 only discharges the papers S1 and S2 to the discharging tray 30.

The first and second flipping elements operate in the duplex reading mode, and allow the second sides P2 of the papers S1 and S2 to be read first, before the first sides P1 thereof are read. By doing so, the papers S1 and S2 are not necessarily re-conveyed only to collate papers S1 and S2 as in the conventional case. The papers S1 and S2 are loaded on the feeding tray 20 with the first side S1 of the first paper P1 facing the feeding tray 20 and the second side P2 of the first paper S1-, facing the first side P1 of the second paper S2 loaded on top of the paper S1, are loaded on the discharging tray 30 with the second side P2 of the second paper S2 facing the discharging tray 30 and the first side S1 of the second paper S2 facing the second side P2 of the first paper S1 loaded on top of the first paper S1.

To read the second side P2 first in the duplex reading mode, the flipping elements are upstream and downstream of the scanning module 90, respectively. The first flipping element is located on the bypass path 510 which is upstream of the scanning module 90, and flips the papers S1 and S2 before the papers S1 and S2 reach the scanning module 90, to read the second side P2 first. The second flipping element is located downstream of the scanning module 90, and re-flips the papers S1 and S2 after the papers S1 and S2 pass the scanning module 90, to read the first side P1.

The first flipping element includes the stack roller 416 that is rotatable in both directions, the connecting path 530, and the storage 520. When the stack roller 416 rotates in a first direction to temporarily store the papers S1 and S2 in the storage 520, a front end LE of the papers S1 and S2 which reaches the stack roller 416 is positioned at the storage 520, and a rear end TE thereof is held at the stack roller 416. When the stack roller 416 rotates reversely in a second direction to return the papers S1 and S2 upstream of the scanning module 90, the rear end TE of the papers S1 and S2 reaching the stack roller 416 becomes the front end LE of the papers S1 and S2 moving towards the connecting path 530.

The second flipping element includes the discharging roller 412 rotatable in both directions, the returning path 540, and the discharging tray 30. As described above, when the discharging roller 412 rotates in a first direction to discharge the papers S1 and S2 of which second side P2 is first read, the first end LE of the papers S1 and S2 reaching the discharging roller 412 is positioned at the discharging tray 30, and the rear end TE thereof is held at the discharging roller 412. When the discharging roller 412 rotates reversely in a second direction to convey the papers S1 and S2 towards the returning path 540, the rear end TE of the papers S1 and S2 reaching the discharging roller 412 becomes the front end LE of the papers S1 and S2 moving towards the returning path 540. After reaching the returning path 540, the papers S1 and S2 return upstream of the scanning module 90 by the returning roller 414, and are conveyed by the first feed roller 408. The first side P1 is then read, and the papers S1 and S2 are completely discharged out of the ADF 10 by rotating discharging roller 412.

Referring to FIGS. 4 to 7, sensors, which are located at the entry sides and the exit sides of each roller and detect whether the papers S1 and S2 are conveyed, are indicated by an alphabet letter in a triangle. The simplex path is indicated by the sequence a-b-c-d-e-f-g, and the duplex path is indicated by the sequence a-b-k-l-m-d-e-f-i-j-c-d-e-f-g.

Duplex reading efficiency will now be roughly estimated except for the papers S1 and S2 which are fed first and last. When it is sensed that the rear end TE1 of the first paper S1 passes point d, the front end LE2 of the second paper S2 may be synchronized to pass point m. After the first and second sides P1 and P2 are read while the rear end TE1 of the first paper S1 passes the path d-e-f-g-f-i-j-c-d, the front end LE2 of the second paper S2 stored in the storage 520 is conveyed to point d, and follows the same conveying path. For convenience, we assume that the simplex path a-b-c-d-e-f-g and the duplex path of d-e-f-g-f-i-j-c-d have the same length. Then, a time for discharging a sheet of the papers S1 and S2 in the simplex reading mode is almost the same to a time for discharging a sheet of the papers S1 and S2 in the duplex reading mode. In practice, considering the conveying distance of the first and last papers S1 and S2 and the separation distance between the papers S1 and S2, the duplex reading efficiency is about 80%.

The shorter the duplex path d-e-f-g-f-i-j-c-d with respect to the simplex path a-b-c-d-e-f-g, the better the duplex reading efficiency. Thus, the length of the conveying path from the discharging roller 412 to the scanning module 90 via the returning path 540 is preferably shorter than the length of the conveying path from the pick-up unit 401 to the scanning module 90.

Accordingly, in aspects of the present invention, a duplex path is provided which is distinguishable from a simplex path, and can convey a plurality of sheets of paper at different positions, thereby improving reading efficiency. In addition, the simplex path and the duplex path can be swiftly and correctly selected by a path selecting element having a simple structure. In addition, in a duplex reading mode, the plurality of sheets of paper are adjacent each other by reducing a separation distance between the paper sheets, thereby shortening a returning path length. In addition, a second side of paper is read first by a flipping element, and thus the papers of which both sides are read are collated and discharged, thereby significantly improving duplex reading efficiency.

While aspects of the present invention has been particularly shown and described with reference to exemplary embodiments thereof, it will be understood by those skilled in the art that various changes in form and details may be made therein without departing from the spirit and scope of the present invention as defined by the appended claims, and equivalents thereof.

What is claimed is:

1. An image reading apparatus comprising: a scanning module which reads an image from a paper; and an auto document feeder apparatus which conveys the paper to the scanning module, the auto document feeder apparatus comprising: a simplex path, which is a conveying path for the paper while in a simplex reading mode; a duplex path, which is distinguishable from the simplex path, and conveys a plurality of sheets of the paper simultaneously at different positions along the duplex path in a duplex reading mode; and a path selecting element which opens the simplex path to allow the paper to be conveyed along the simplex path while in the simplex reading mode, and opens the duplex path to allow the plurality of sheets of the paper to be conveyed along the duplex path while in the duplex reading mode, wherein the path selecting element selectively moves to direct the paper in one of a first direction toward the simplex path in the simplex reading mode and a second direction toward the duplex path in the duplex reading mode, at a point upstream of the scanning module before any image is read from the paper, wherein, in the duplex reading mode, the paper is directed by the path selecting element to a bypass path which branches off from the simplex path at a point between a pick-up unit which picks up the paper and the scanning module, the bypass path comprising a storage which temporarily stores the picked up paper prior to any image from the paper being introduced to the scanning module being read and a first flipping element to flip the paper, wherein, in the duplex reading mode, after a first side of the paper is read, the paper is flipped by a second flipping element to a second side and conveyed along the duplex path to the scanning module a second time to read the second side of the paper without moving the path selecting element.

2. The image reading apparatus of claim 1, wherein the path selecting element comprises a paper guide which is selectively pivoted to a first position for opening the simplex path while in the simplex reading mode and a second position for opening the duplex path while in the duplex reading mode.

3. The image reading apparatus of claim 2, wherein: the simplex path comprises the pick-up unit which picks up the paper and a scanning path on which is located the scanning module, and the duplex path comprises: the scanning path; a connecting path which returns the paper temporarily stored in the storage to a point between the bypass path and the scanning module; and a returning path which re-conveys the paper after one side is read while the paper passes over the scanning module to a point in the scanning path to be re-conveyed to the scanning module.

4. The image reading apparatus of claim 3, wherein the bypass path and the connecting path convey the paper independently from the scanning path and the returning path.

5. The image reading apparatus of claim 4, wherein a time point where a rear end of a first sheet of paper reaches the scanning module after passing along the returning path is synchronized with a time point where a front end of a second sheet of paper stored in the storage reaches the scanning module following the rear end of the first sheet of paper.

6. The image reading apparatus of claim 5, wherein: in the simplex reading mode, a side of the paper is read but the other side of the paper is not read, and in the duplex reading mode, the first side of the paper is read while the paper passes the scanning module from the connecting path, and the second side is subsequently read while the paper re-passes the scanning module from the returning path.

7. The image reading apparatus of claim 3, further comprising a stack roller which rotates in a first direction to store the picked up paper in the storage, and rotates in a second direction to convey the paper stored in the storage towards the connecting path.

8. The image reading apparatus of claim 3, further comprising:
a discharging tray on which the paper is loaded after the paper is discharged out of the auto document feeder apparatus; and
a discharging roller which rotates in a first direction to discharge the paper to the discharging tray after the read paper passes the scanning module, and rotates in a second direction to re-convey the paper discharged onto the discharging tray into the automatic document feeder apparatus towards the returning path.

9. The image reading apparatus of claim 8, further comprising:
a first conveying path extending from the discharging roller to the scanning module and including the returning path when in the duplex reading mode, and
a second conveying path extending from the pick-up unit to the scanning module when in the duplex reading mode, the first conveying path being shorter than the second conveying path.

10. The image reading apparatus of claim 3, wherein the pick-up unit comprises:
a pick-up belt to pick up the paper;
first and second pick-up rollers which drive the pick-up belt to pick up the paper, and support both ends of the pick-up belt; and
an arranging unit which arranges a front end of the picked up paper.

11. The image reading apparatus of claim 3, further comprising a first feed roller located upstream of the scanning module and a second feed roller downstream of the scanning module, wherein the first and second feed rollers convey the paper.

12. The image reading apparatus of claim 3, further comprising a returning roller which conveys the paper from the returning path towards the scanning path.

13. An image reading apparatus comprising:
a scanning module which reads an image from a paper; and
an auto document feeder apparatus which conveys the paper to the scanning module, the auto document feeder apparatus comprising:
a pick-up unit picking up the paper;
a scanning path on which are located the pick-up unit and the scanning module;
a bypass path which branches off from the scanning path at a point between the pick-up unit and the scanning module, and which comprises a storage which temporarily stores the picked up paper prior to any image from the paper being introduced to the scanning module being read;
a path selecting element which opens the bypass path in a duplex reading mode;
a first flipping element located at the bypass path; and
a second flipping element located at downstream of the scanning module such that the scanning module is between the first and second flipping elements such that the first and second flipping elements flip the paper in the duplex reading mode,
wherein:
a first side of the paper is read in a simplex reading mode, and
in the duplex reading mode, the paper is flipped by the first flipping element to read a second side of the paper first, and the paper is re-flipped by the second flipping element to read the first side.

14. The image reading apparatus of claim 13, the path selecting element comprises a paper guide which pivots to open and close the bypass path.

15. The image reading apparatus of claim 14, wherein the first flipping element comprises:
a connecting path which returns the paper in the storage to a point upstream of the scanning module to be introduced to the scanning module; and
a stack roller which rotates in a first direction to store the picked up paper in the storage, and rotates in a second direction to convey the paper stored in the storage towards the connecting path, wherein a rear end of the paper reaching the stack roller when the paper is being stored in the storage becomes a front end of the paper when the paper is moving towards the connecting path.

16. The image reading apparatus of claim 15, wherein: the second flipping element comprises:

a discharging tray on which is loaded the paper discharged out of the auto document feeder apparatus;

a returning path which re-conveys the paper after having one side read by the scanning module to another point upstream of the scanning module; and a discharging roller which rotates in a first direction to discharge the paper to the discharging tray after the paper passes the scanning module, and rotates in a second direction to convey the paper discharged out of the discharging tray towards the returning path, and the rear end of the paper reaching the stack roller becomes the front end of the paper moving towards the returning path.

17. The image reading apparatus of claim 16, wherein the bypass path and the connecting path convey the paper independently from the scanning path and the returning path.

18. The image reading apparatus of claim 17, wherein a time point where a rear end of a first sheet of paper reaches the scanning module after passing along the returning path is synchronized with a time point where a front end of a second sheet of paper stored in the storage reaches the scanning module following the rear end of the first paper.

19. The image reading apparatus of claim 18, further comprising:

a first conveying path extending from the discharging roller to the scanning module and including the returning path; and a second conveying path extending from the pick-up unit to the scanning module, the first conveying path being shorter than the second conveying path.

20. An image reading apparatus comprising: a scanning module which reads an image from a print medium; and an auto document feeder apparatus which conveys the print medium to the scanning module, the auto document feeder apparatus comprising: a scanning path on which is located the scanning module; a storage path separate from the scanning path comprising a storage which selectively stores the print medium and a first flipping element to flip the print medium, the storage path branching off from the scanning path at a point between a pick-up unit which picks up the print medium and the scanning module; and a controller which, prior to any side of the print medium being read by the scanning module, temporarily stores the print medium in the storage path and controls the first flipping element to flip the print medium to a first side, and reintroduces the print medium from the storage path to the scanning path for the first side to be read by the scanning module, and, after the first side of the print medium is read and prior to a second side being read by the scanning module, controls a second flipping element to flip the print medium to the second side, and conveys the print medium to the scanning module a second time to read the second side without temporarily storing the print medium in the storage path.

21. An image reading apparatus comprising: a scanning module which reads images from corresponding print media; and an auto document feeder apparatus which conveys the print media to the scanning module, the auto document feeder apparatus comprising: a feeder unit which receives the print media collated in a predetermined order; a pick-up unit to pick up the print media from the feeder unit; a first path for use in orienting each of the print media received such that the scanning module reads only a first side of the print media; a second path separate from the first path for use in orienting each of the print media after the scanning module reads the first side of the print media, such that the scanning module reads only a second side of the print media; and a controller which controls each print media to enter each of the first and second paths only once while maintaining the read print media in the predetermined order after the first and second sides have been read by the scanning module, wherein the first path further comprises a bypass path disposed at a point between the pick-up unit and the scanning module, and which comprises a storage which includes a roller which rotates in a first direction to temporarily store the print media prior to the first side of the print media being read by the scanning module, and rotates in a second direction to convey the print media to the scanning module to be read, wherein the second path further comprises a flipping element to flip the print media to the second side, the flipping element being disposed downstream of the scanning module such that the scanning module is between the roller and flipping element.

* * * * *